United States Patent
Yuan et al.

(10) Patent No.: US 12,349,129 B2
(45) Date of Patent: Jul. 1, 2025

(54) UPLINK CONTROL INFORMATION MULTIPLEXING FOR DYNAMIC SPECTRUM SHARING

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 17/759,845

(22) PCT Filed: Feb. 7, 2020

(86) PCT No.: PCT/CN2020/074473
§ 371 (c)(1),
(2) Date: Jul. 29, 2022

(87) PCT Pub. No.: WO2021/155553
PCT Pub. Date: Aug. 12, 2021

(65) Prior Publication Data
US 2023/0095833 A1    Mar. 30, 2023

(51) Int. Cl.
*H04W 72/1268* (2023.01)
*H04W 72/21* (2023.01)
*H04W 72/23* (2023.01)

(52) U.S. Cl.
CPC ....... *H04W 72/1268* (2013.01); *H04W 72/21* (2023.01); *H04W 72/23* (2023.01)

(58) Field of Classification Search
CPC ............. H04W 72/1268; H04W 72/21; H04W 72/23–232; H04W 12/1268; H04W 12/21; H04W 12/23–232
See application file for complete search history.

(56) References Cited

U.S. PATENT DOCUMENTS

| | | | |
|---|---|---|---|
| 2011/0228863 A1 | 9/2011 | Papasakellariou et al. | |
| 2012/0113831 A1 | 5/2012 | Pelletier et al. | |

(Continued)

FOREIGN PATENT DOCUMENTS

| | | |
|---|---|---|
| CN | 105991249 A | 10/2016 |
| CN | 106961744 A | 7/2017 |
| CN | 107409021 A | 11/2017 |

OTHER PUBLICATIONS

Qualcomm Incorporated: "Remaining Issues for Multiplexing UCI on PUSCH", 3GPP TSG RAN WG1 Meeting AH 1801, R1-1801000, 3rd Generation Partnership Project, Mobile Competence Centre, 650, Route Des Lucioles, F-06921 Sophia-Antipolis Cedex, France, Jan. 22, 2018, 13 Pages, XP051382211, pp. 1-3-pp. 8-13.

(Continued)

*Primary Examiner* — Thomas R Cairns
(74) *Attorney, Agent, or Firm* — Harrity & Harrity, LLP

(57) ABSTRACT

Various aspects of the present disclosure generally relate to wireless communication. In some aspects, a user equipment (UE) may receive an indication associated with multiplexing uplink control information (UCI) on a physical uplink shared channel (PUSCH), wherein the indication is associated with multiple component carriers (CCs) on which respective PUSCH transmissions are to be performed; identify one or more CCs, of the multiple CCs, to which the indication applies; and selectively transmit the UCI via the PUSCH on a CC, of the one or more CCs, in accordance with the indication. Numerous other aspects are provided.

31 Claims, 10 Drawing Sheets

(56) References Cited

U.S. PATENT DOCUMENTS

2018/0006790 A1* 1/2018 Park .................. H04L 1/1664
2018/0077698 A1 3/2018 Takeda et al.
2019/0223207 A1 7/2019 Huang et al.
2021/0168794 A1* 6/2021 Zhang ................ H04L 5/0044

OTHER PUBLICATIONS

Supplementary European Search Report—EP20918108—Search Authority—The Hague—Sep. 8, 2023.
Ericsson: "HARQ and Scheduling Enhancements for NR-U", 3GPP TSG-RAN WG1 Meeting #99, R1-1912711, Reno, USA, Nov. 18-22, 2019, Nov. 22, 2019 (Nov. 22, 2019) the Whole Document, 13 Pages.
International Search Report and Written Opinion—PCT/CN2020/074473—ISA/EPO—Nov. 12, 2020.
Qualcomm Incorporated: "Remaining Issues for Multiplexing UCI on PUSCH", 3GPP TSG RAN WG1 Meeting AH 1801, R1-1801000, 3rd Generation Partnership Project, Mobile Competence Centre, 650, Route Des Lucioles, F-06921 Sophia-Antipolis Cedex, France, Jan. 24, 2018, 13 Pages, XP051382211.

* cited by examiner

UPLINK CONTROL INFORMATION MULTIPLEXING FOR DYNAMIC SPECTRUM SHARING

CROSS-REFERENCE TO RELATED APPLICATION

This application is a 371 national stage of Patent Cooperation Treaty (PCT) Application No. PCT/CN2020/074473 filed on Feb. 7, 2020, entitled "UPLINK CONTROL INFORMATION MULTIPLEXING FOR DYNAMIC SPECTRUM SHARING," which is hereby expressly incorporated by reference herein.

FIELD OF THE DISCLOSURE

Aspects of the present disclosure generally relate to wireless communication and to techniques and apparatuses for uplink control information (UCI) multiplexing for dynamic spectrum sharing (DSS).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include receiving an indication associated with multiplexing uplink control information (UCI) on a physical uplink shared channel (PUSCH), wherein the indication is associated with multiple component carriers (CCs) on which respective PUSCH transmissions are to be performed; identifying one or more CCs, of the multiple CCs, to which the indication applies; and selectively transmitting the UCI via the PUSCH on a CC, of the one or more CCs, in accordance with the indication.

In some aspects, a method of wireless communication, performed by a base station, may include transmitting an indication associated with multiplexing UCI on a PUSCH, wherein the indication is associated with multiple CCs on which respective PUSCH transmissions are to be performed, and wherein the indication applies to one or more CCs of the multiple CCs; and receiving the UCI via the PUSCH on a CC, of the one or more CCs, in accordance with the indication.

In some aspects, a UE for wireless communication may include a memory and one or more processors operatively coupled to the memory. The memory and the one or more processors may be configured to receive an indication associated with multiplexing UCI on a PUSCH, wherein the indication is associated with multiple CCs on which respective PUSCH transmissions are to be performed; identify one or more CCs, of the multiple CCs, to which the indication applies; and selectively transmit the UCI via the PUSCH on a CC, of the one or more CCs, in accordance with the indication.

In some aspects, a base station for wireless communication may include a memory and one or more processors operatively coupled to the memory. The memory and the one or more processors may be configured to transmit an indication associated with multiplexing UCI on a PUSCH, wherein the indication is associated with multiple CCs on which respective PUSCH transmissions are to be performed, and wherein the indication applies to one or more CCs of the multiple CCs; and receive the UCI via the PUSCH on a CC, of the one or more CCs, in accordance with the indication.

In some aspects, a non-transitory computer-readable medium may store one or more instructions for wireless communication. The one or more instructions, when executed by one or more processors of a UE, may cause the one or more processors to receive an indication associated with multiplexing UCI on a PUSCH, wherein the indication is associated with multiple CCs on which respective PUSCH transmissions are to be performed; identify one or more CCs, of the multiple CCs, to which the indication applies; and selectively transmit the UCI via the PUSCH on a CC, of the one or more CCs, in accordance with the indication.

In some aspects, a non-transitory computer-readable medium may store one or more instructions for wireless communication. The one or more instructions, when executed by one or more processors of a base station, may cause the one or more processors to transmit an indication associated with multiplexing UCI on a PUSCH, wherein the indication is associated with multiple CCs on which respective PUSCH transmissions are to be performed, and wherein the indication applies to one or more CCs of the multiple CCs; and receive the UCI via the PUSCH on a CC, of the one or more CCs, in accordance with the indication.

In some aspects, an apparatus for wireless communication may include means for receiving an indication associated with multiplexing UCI on a PUSCH, wherein the indication is associated with multiple CCs on which respective PUSCH transmissions are to be performed; means for identifying one or more CCs, of the multiple CCs, to which the indication applies; and means for selectively transmitting the UCI via the PUSCH on a CC, of the one or more CCs, in accordance with the indication.

In some aspects, an apparatus for wireless communication may include means for transmitting an indication associated with multiplexing UCI on a PUSCH, wherein the indication is associated with multiple CCs on which respective PUSCH transmissions are to be performed, and wherein the indication applies to one or more CCs of the multiple CCs; and means for receiving the UCI via the PUSCH on a CC, of the one or more CCs, in accordance with the indication.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
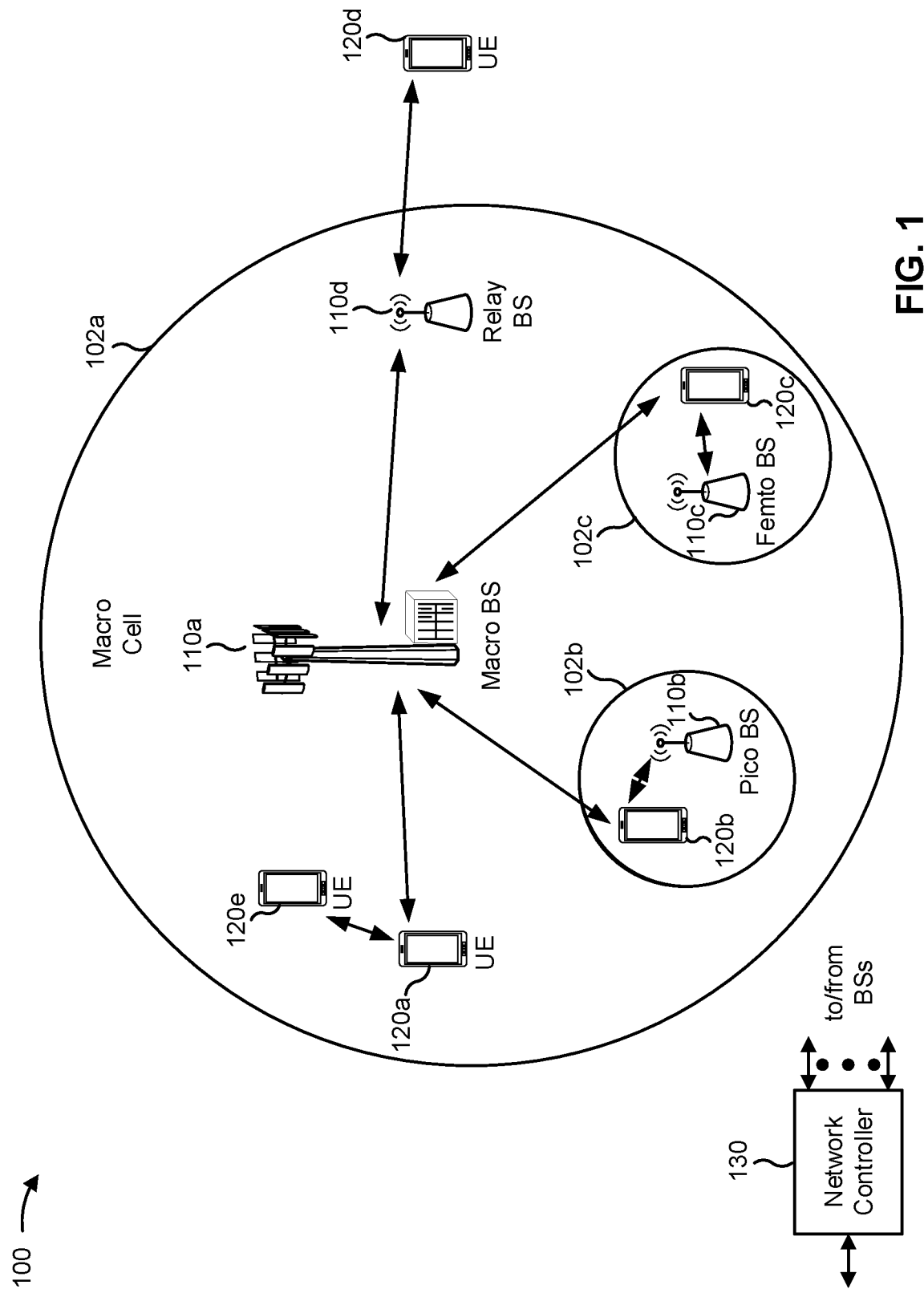
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The term "base station," used herein, embraces "eNB", "base station", "NR BS", "gNB", "TRP", "AP", "node B", "5G NB", "cell," and/or the like. Furthermore, as noted above, the term "cell" can be used to refer to a base station structure for communications with a UE using a particular CC.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband interne of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
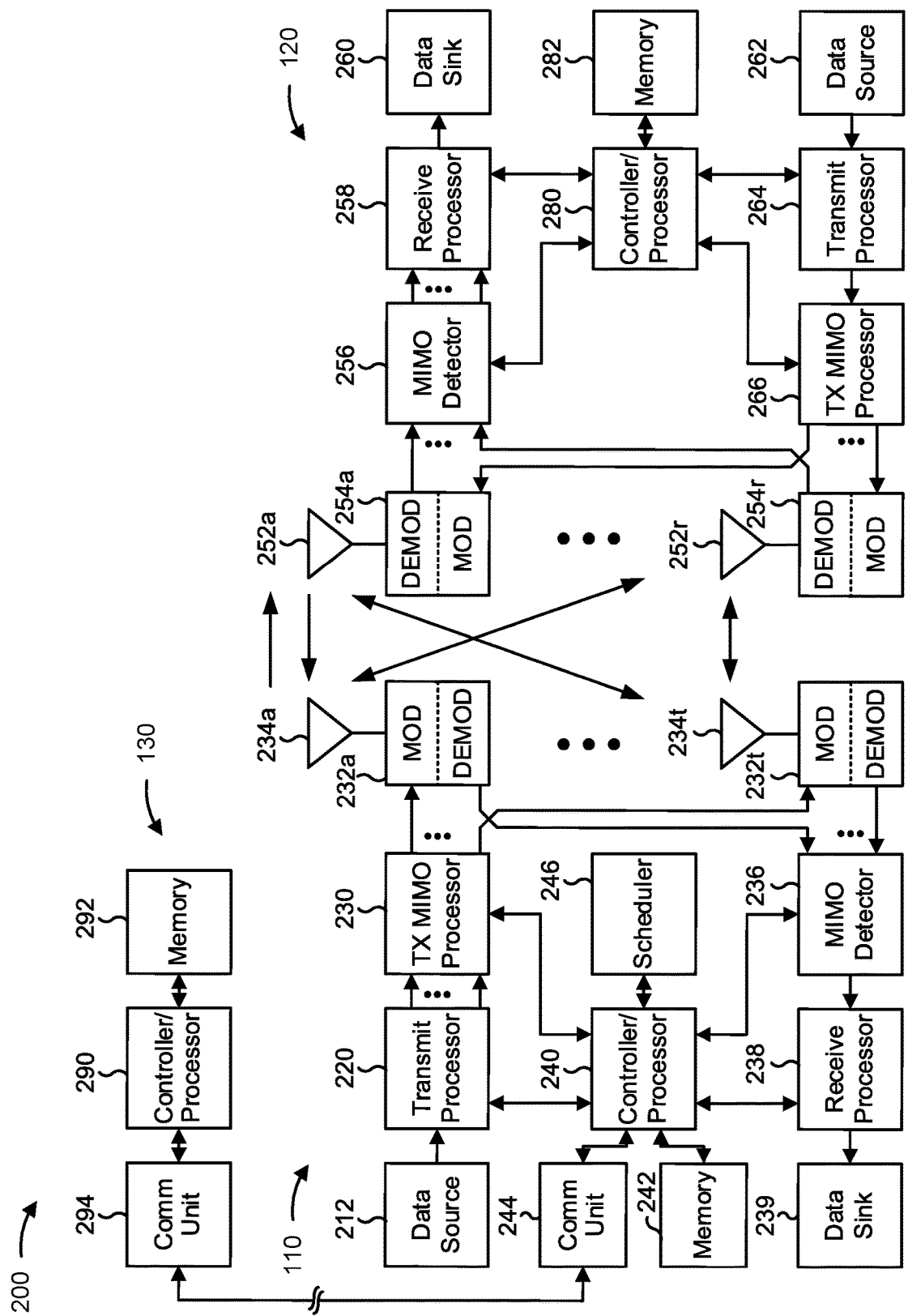
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UCI multiplexing for DSS, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed (e.g., directly, or after compiling, converting, interpreting, and/or the like) by one or more processors of the base station 110 and/or the UE 120, may perform or direct operations of, for example, process 900 of FIG. 9, process 1000 of FIG. 10, and/or other processes as described herein. In some aspects, executing instructions may include running the instructions, converting the instructions, compiling the instructions, interpreting the instructions, and/or the like. A scheduler 246 may schedule UEs for data transmission on the downlink and/or uplink.

In some aspects, UE 120 may include means for receiving an indication associated with multiplexing uplink control information (UCI) on a physical uplink shared channel (PUSCH), wherein the indication is associated with multiple component carriers (CCs) on which respective PUSCH transmissions are to be performed; means for identifying one or more CCs, of the multiple CCs, to which the indication applies; means for selectively transmitting the UCI via the PUSCH on a CC, of the one or more CCs, in accordance with the indication; means for determining that the UCI is not to be transmitted via the respective PUSCH transmissions based at least in part on a value of the DAI; means for transmitting one or more UL-SCHs on the multiple CCs based at least in part on a value of the UL-SCH indication; means for receiving information configuring respective sets of beta offset values for each CC of the multiple CCs, wherein the beta offset indication identifies an index, and wherein the index is used to determine a beta offset value from a set of beta offset values, of the respective sets of beta offset values, corresponding to the CC on which the UCI is transmitted; means for identifying the one or more CCs to which the indication applies based at least in part on selecting the CC on which the UCI is transmitted in accordance with a rule for selecting the CC on which the UCI is transmitted; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting an indication associated with multiplexing uplink control information (UCI) on a physical uplink shared channel (PUSCH), wherein the indication is associated with multiple component carriers (CCs) on which respective PUSCH transmissions are to be performed, and wherein the indication applies to one or more CCs of the multiple CCs; means for receiving the UCI via the PUSCH on a CC, of the one or more CCs, in accordance with the indication; means for determining that the UCI is not to be received via the respective PUSCH transmissions based at least in part on a value of the DAI; means for receiving one or more UL-SCHs on the multiple CCs based at least in part on a value of the UL-SCH indication; means for transmitting information configuring respective sets of beta offset values for each CC of the multiple CCs, wherein the beta offset indication identifies an index, and wherein the index is used to determine a beta offset value from a set of beta offset values, of the respective sets of beta offset values, corresponding to the CC on which the UCI is transmitted; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

NR may provide for the use of dynamic spectrum sharing (DSS). DSS enables a network operator to provide 4G and 5G access within the same spectrum, thus improving coverage and simplifying rollout of 5G services. In some cases, such as in DSS, a physical downlink control channel (PDCCH) on a secondary cell (SCell) of a UE may schedule a communication, such as a physical downlink shared channel (PDSCH) or a physical uplink shared channel (PUSCH), on a primary cell (PCell) or a primary secondary cell (PSCell) of the UE. For example, scheduling on multiple such cells may be performed using a single DCI, and may involve certain indications, such as a downlink assignment indicator (DAI), an uplink shared channel (UL-SCH) indicator, a beta offset indicator, and/or the like. However, as the number of cells scheduled by the DCI increases, so may the complexity, size, and blind decoding difficulty of the DCI.

Some techniques and apparatuses described herein provide for indication of parameters (e.g., DAI indicators, UL-SCH indicators, beta offset indicators, and/or the like) for a group of CCs scheduled by a single DCI. For example, the DAI indicator and/or the UL-SCH indicator may be applied across multiple PUSCHs on the group of CCs. As another example, a UE may determine which CC corresponds to a beta offset indicator based at least in part on a rule for uplink control information (UCI) multiplexing. In this case, each CC of the group of CCs may be associated with a respective set of beta offset values, and the UE may determine which set of beta offset values is to be used in connection with the beta offset indicator based at least in part on the rule for UCI multiplexing.

In this way, the size and complexity of DCI used to schedule a group of CCs is reduced. For example, by applying an indication to multiple CCs or identifying a CC to which the indication applies, the number of indications to be included in the DCI may be reduced in proportion to a size of the group of CCs. Thus, computing resources of a base station that transmits the DCI and a UE that receives the DCI may be conserved.

Figure 3:
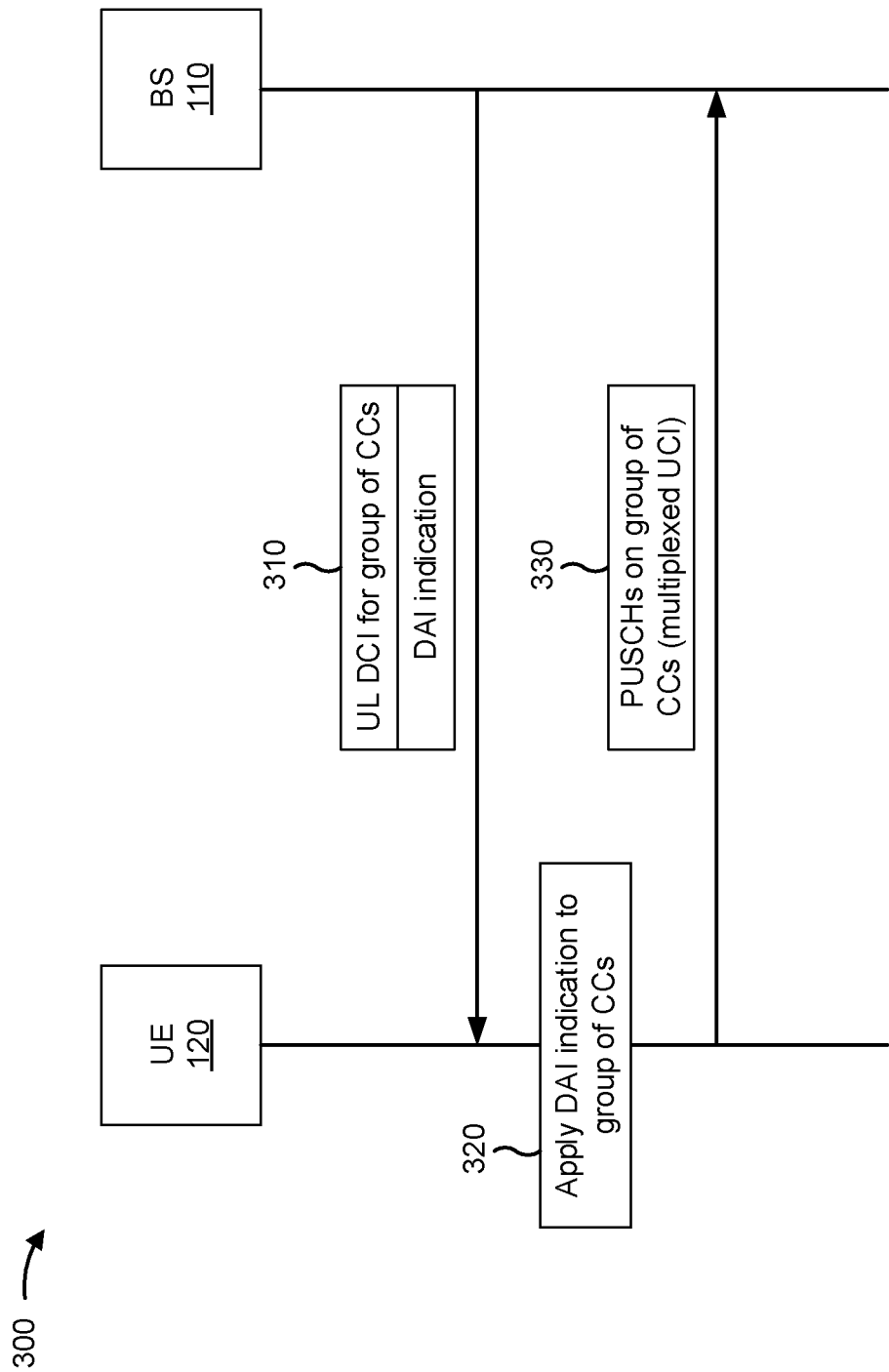
FIGS. 3, 5, and 7 are diagram illustrating examples of application of uplink downlink control information (DCI) for multiple component carriers (CCs), in accordance with various aspects of the present disclosure.

FIG. 3 is a diagram illustrating an example 300 of application of uplink DCI for multiple CCs, in accordance with various aspects of the present disclosure. As shown, example 300 includes a UE 120 and a BS 110.

As shown in FIG. 3, and by reference number 310, the UE 120 may receive, from the BS 110, DCI for a group of CCs. For example, the group of CCs may be associated with a dynamic spectrum sharing (DSS) configuration of the UE 120. In some aspects, the group of CCs may include one or more PCells, one or more SCells, one or more PSCells, and/or the like. For example, the DCI may be received on an SCell, and may include uplink DCI for a group of PCells and/or PSCells. In example 300, the uplink DCI includes a DAI for the group of CCs.

As shown by reference number 320, the UE 120 may apply the DCI to the group of CCs. For example, the UE 120 may determine that the DCI applies to each CC of the group of CCs, and may perform an action in accordance with the DAI for the group of CCs based at least in part on the DCI applying to each CC of the group of CCs. For a more detailed description of applying the DAI for the group of CCs, refer to FIG. 4. In some aspects, the UE 120 may determine that the indicator (e.g., the DAI) applies to each CC of the group of CCs based at least in part on each CC, of the group of CCs, being scheduled by the DCI. For example, the DCI may schedule respective uplink transmissions (e.g., PUSCHs and/or the like) on each CC of the group of CCs. The UE 120 may identify each CC on which an uplink transmission is scheduled by the DCI as part of the group of CCs, and may apply the indicator for the group of CCs.

As shown by reference number 330, the UE 120 may transmit PUSCHs on the group of CCs. As further shown, UCI (e.g., hybrid automatic repeat request (HARQ) acknowledgment (ACK) feedback or any other UCI payload) may be multiplexed on one or more of the PUSCHs. For example, the UE 120 may multiplex the UCI in accordance with the DAI, as described in more detail in connection with FIG. 4. Thus, the UE 120 may apply a single DAI to a group of CCs, thereby reducing the size and complexity of the DCI relative to DCI that includes respective DAIs for each CC of the group of CCs.

As indicated above, FIG. 3 is provided as an example. Other examples may differ from what is described with respect to FIG. 3.

Figure 4:
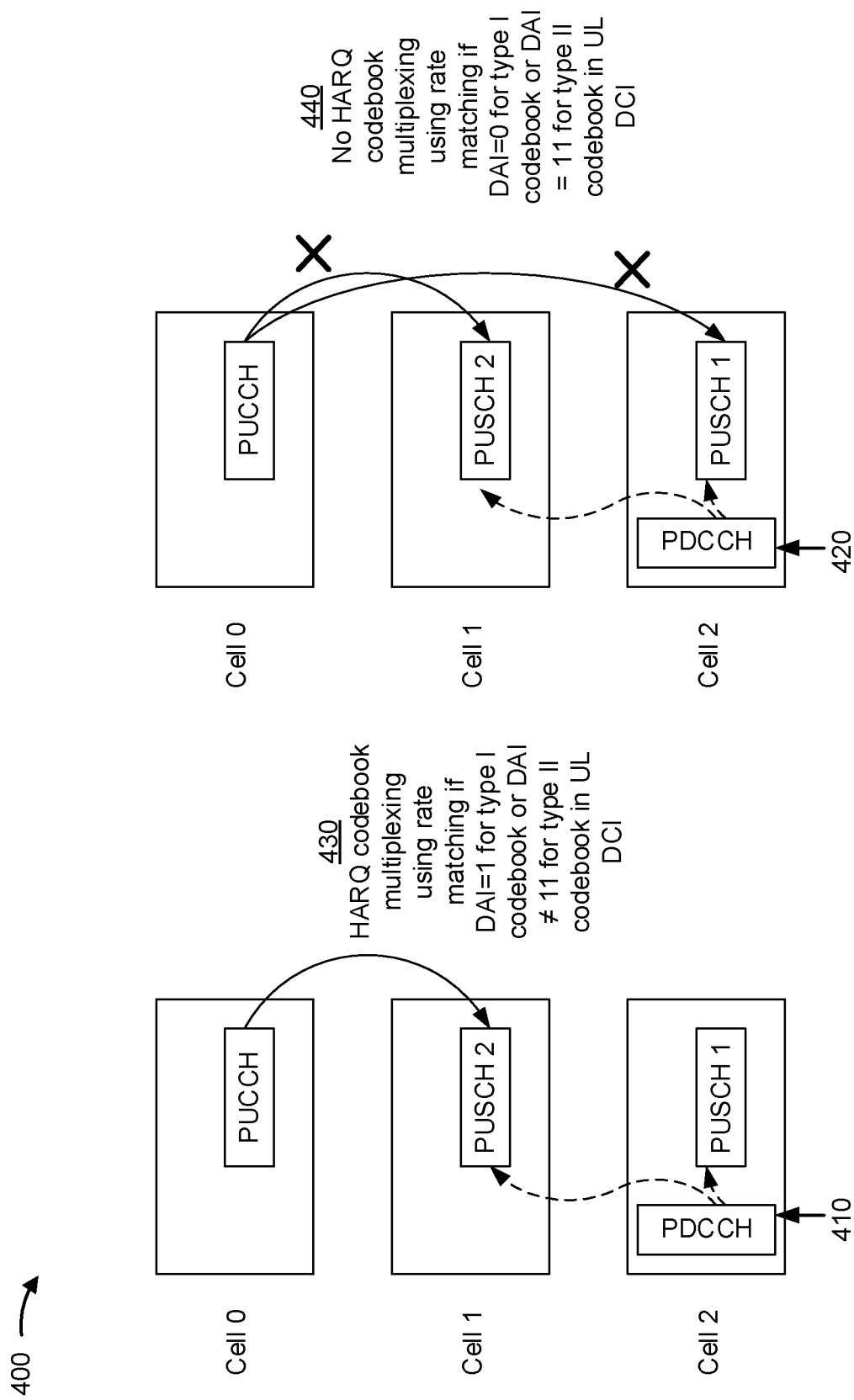
FIGS. 4, 6, and 8 are diagrams illustrating examples of UCI multiplexing based at least in part on uplink DCI for multiple CCs, in accordance with various aspects of the present disclosure.

FIG. 4 is a diagram illustrating an example 400 of UCI multiplexing based at least in part on uplink DCI for multiple CCs, in accordance with various aspects of the present disclosure. Example 400 shows two scenarios: a first scenario, on the left side of FIG. 4, in which the DAI indicates that HARQ codebook multiplexing (e.g., UCI multiplexing) is to be performed, and a second scenario, on the right side of FIG. 4, in which the DAI indicates that HARQ codebook multiplexing is not to be performed. As shown in FIG. 4, a physical downlink control channel (PDCCH) 410/420 is received on a cell 2. As further shown, the PDCCH 410/420 schedules a PUSCH 2 on a cell 1 and a PUSCH 1 on the cell 2. Thus, the PDCCH 410/420 includes DCI that schedules PUSCHs on a group of cells including the cell 1 and the cell 2.

A UE (e.g., UE 120) may apply the DCI to the cell 1 and the cell 2 based at least in part on the cell 1 and the cell 2 being scheduled by the DCI on the PDCCH 410/420. For example, as shown by reference number 430, the UE may determine that HARQ codebook multiplexing (e.g., UCI multiplexing) is to be performed on one or more of the cell 1 and the cell 2 based at least in part on a value of the DAI in the uplink DCI, and may perform HARQ codebook multiplexing using rate matching. As another example, as shown by reference number 440, the UE may determine that no HARQ codebook multiplexing is to be performed with regard to any CC of the group of CCs based at least in part on a value of the DAI. Thus, a DAI indication in uplink DCI is applicable to multiple PUSCHs on a group of CCs scheduled by the same DCI. The same value of a DAI field may be applicable for multiplexing HARQ-ACK information in the PUSCHs on different CCs scheduled by the same DCI.

As indicated above, FIG. 4 is provided as an example. Other examples may differ from what is described with respect to FIG. 4.

Figure 5:
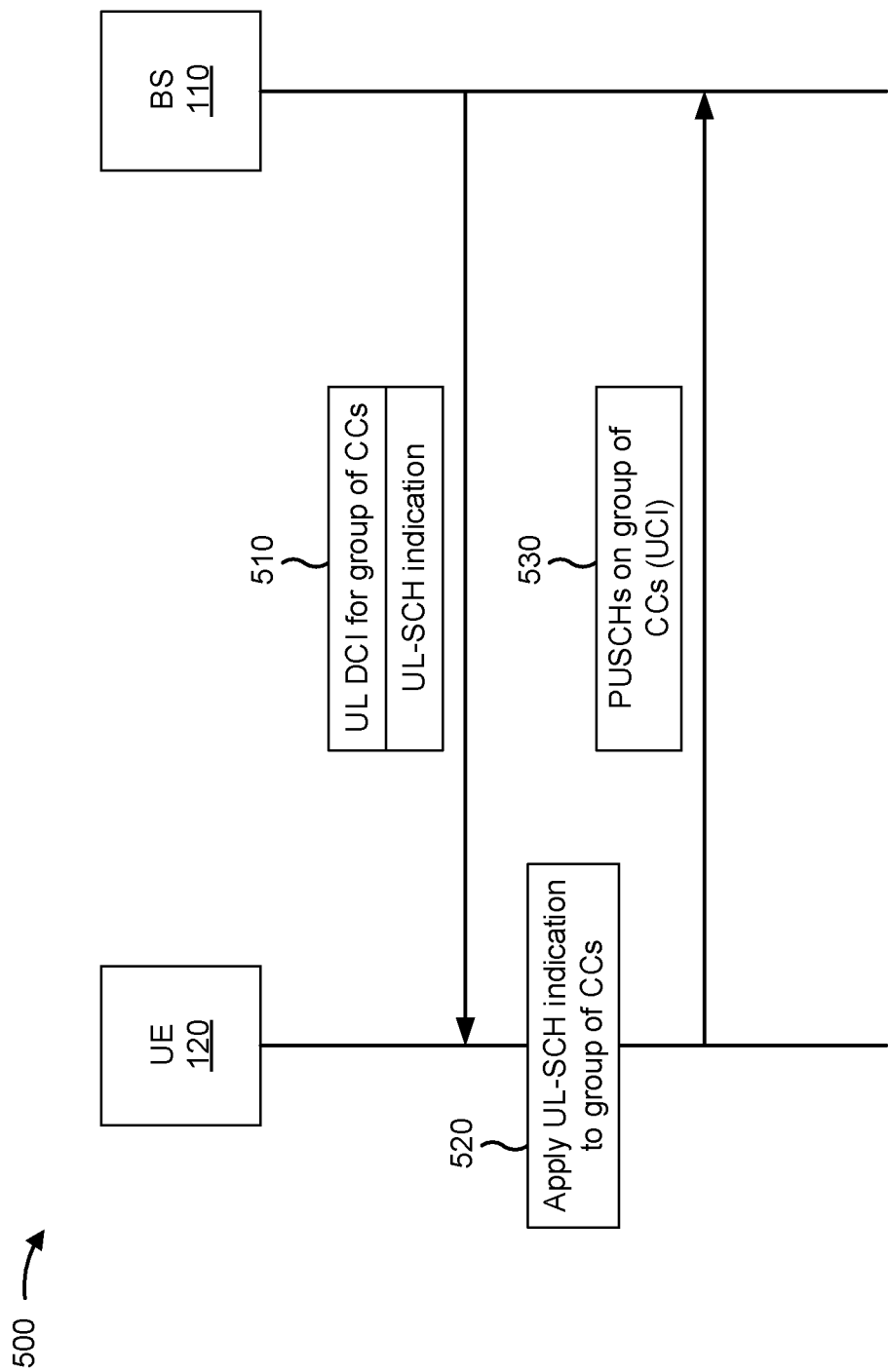

FIG. 5 is a diagram illustrating an example 500 of application of uplink DCI for multiple CCs, in accordance with various aspects of the present disclosure. As shown, example 500 includes a UE 120 and a BS 110. As shown in FIG. 5, and by reference number 510, the UE 120 may receive, from the BS 110, DCI for a group of CCs. For example, the group of CCs may be associated with a DSS configuration of the UE 120. In example 500, the uplink DCI includes an uplink shared channel (UL-SCH) indication for the group of CCs. The UL-SCH indication may indicate whether all PUSCHs on the group of CCs are associated with a UL-SCH. When all PUSCHs are associated with a UL-SCH, then UCI may be multiplexed with one of the UL-SCHs on a PUSCH. When not all PUSCHs are associated with a UL-SCH, then a PUSCH may have only UCI (e.g., a PUSCH with a particular cell index, such as a lowest cell index).

As shown by reference number 520, the UE 120 may apply the DCI to the group of CCs. For example, the UE 120 may determine that the DCI applies to each CC of the group of CCs, and may perform an action in accordance with the UL-SCH indicator for the group of CCs based at least in part on the DCI applying to each CC of the group of CCs. For a more detailed description of applying the UL-SCH indicator for the group of CCs, refer to FIG. 6. In some aspects, the UE 120 may determine that the indicator (e.g., the UL-SCH indicator) applies to each CC of the group of CCs based at least in part on each CC, of the group of CCs, being scheduled by the DCI. For example, the DCI may schedule respective uplink transmissions (e.g., PUSCHs and/or the like) on each CC of the group of CCs. The UE 120 may identify each CC on which an uplink transmission is scheduled by the DCI as part of the group of CCs, and may apply the indicator for the group of CCs.

As shown by reference number 530, the UE 120 may transmit PUSCHs on the group of CCs. As further shown, UCI (e.g., HARQ-ACK feedback, an aperiodic channel state information (A-CSI) report, or any other UCI payload) may be provided on one or more of the PUSCHs. For example, the UE 120 may multiplex the UCI or provide the UCI without multiplexing the UCI in accordance with the UL-SCH indicator, as described in more detail in connection with FIG. 4. Thus, the UE 120 may apply a single UL-SCH indicator to a group of CCs, thereby reducing the size and complexity of the DCI relative to DCI that includes respective UL-SCH indicators for each CC of the group of CCs. For example, by defining a rule for which PUSCH is not to include a UL-SCH when the UL-SCH indicator indicates that a PUSCH, of the group of CCs, includes only UCI, size and complexity of the DCI is reduced relative to explicitly identifying which PUSCH is not to include a UL-SCH.

As indicated above, FIG. 5 is provided as an example. Other examples may differ from what is described with respect to FIG. 5.

Figure 6:
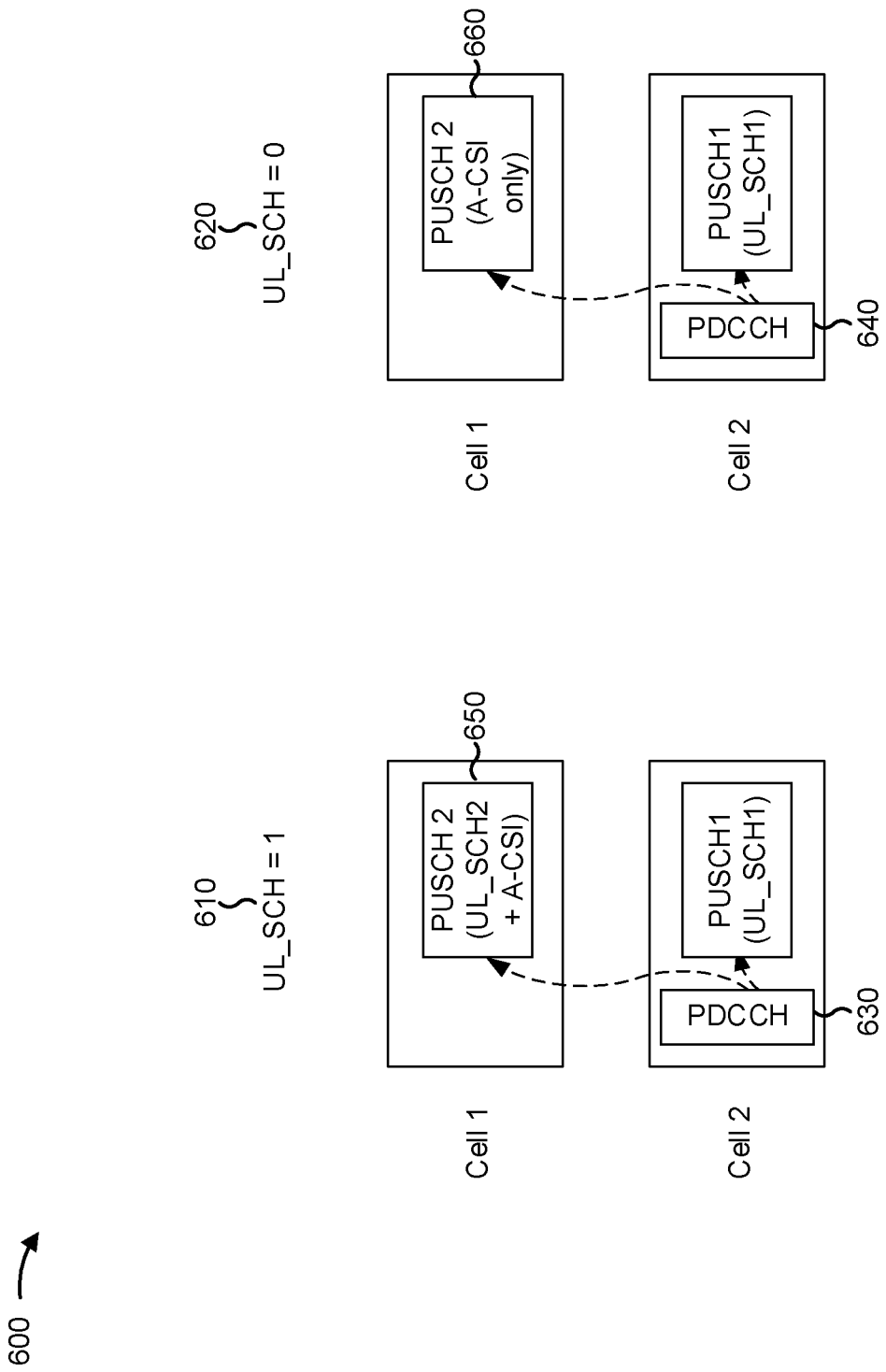

FIG. 6 is a diagram illustrating an example 600 of UCI multiplexing based at least in part on uplink DCI for multiple CCs, in accordance with various aspects of the present disclosure. Example 600 shows two scenarios: a first scenario, on the left side of FIG. 6, in which the UL-SCH indicator 610 indicates that all PDSCHs of a cell and a cell 2 include a UL-SCH, and a second scenario, on the right side of FIG. 6, in which the UL-SCH indicator 620 indicates that not all cells, of the group of cells, include a UL-SCH.

A UE (e.g., UE 120) may apply the DCI to the cell 1 and the cell 2 based at least in part on the cell 1 and the cell 2 being scheduled by the DCI on the PDCCH 630/640. For example, as shown by reference number 650, the UE may multiplex a UL-SCH and UCI (e.g., an A-CSI) on cell 1, and may transmit a UL-SCH on cell 2. As another example, as shown by reference number 660, when the UL-SCH indicator indicates that a PDSCH of the group of CCs does not include a UL-SCH, the UE may identify which UL-SCH is not to include the UL-SCH, and may transmit the UCI on the selected PDSCH. For example, the UE may select the selected PDSCH based at least in part on the selected PUSCH being associated with a lowest cell index of cell 1 and cell 2. Thus, a UL-SCH indicator in uplink DCI is applicable to multiple PUSCHs on a group of CCs scheduled by the same DCI. A first value of the UL-SCH (e.g., 1) may indicate that all the PUSCHs have the UL-SCH. A second value of the UL-SCH (e.g., 0) may indicate that the PUSCH with the lowest cell index can have only UCI (e.g., an A-CSI report if triggered).

As indicated above, FIG. 6 is provided as an example. Other examples may differ from what is described with respect to FIG. 6.

Figure 7:
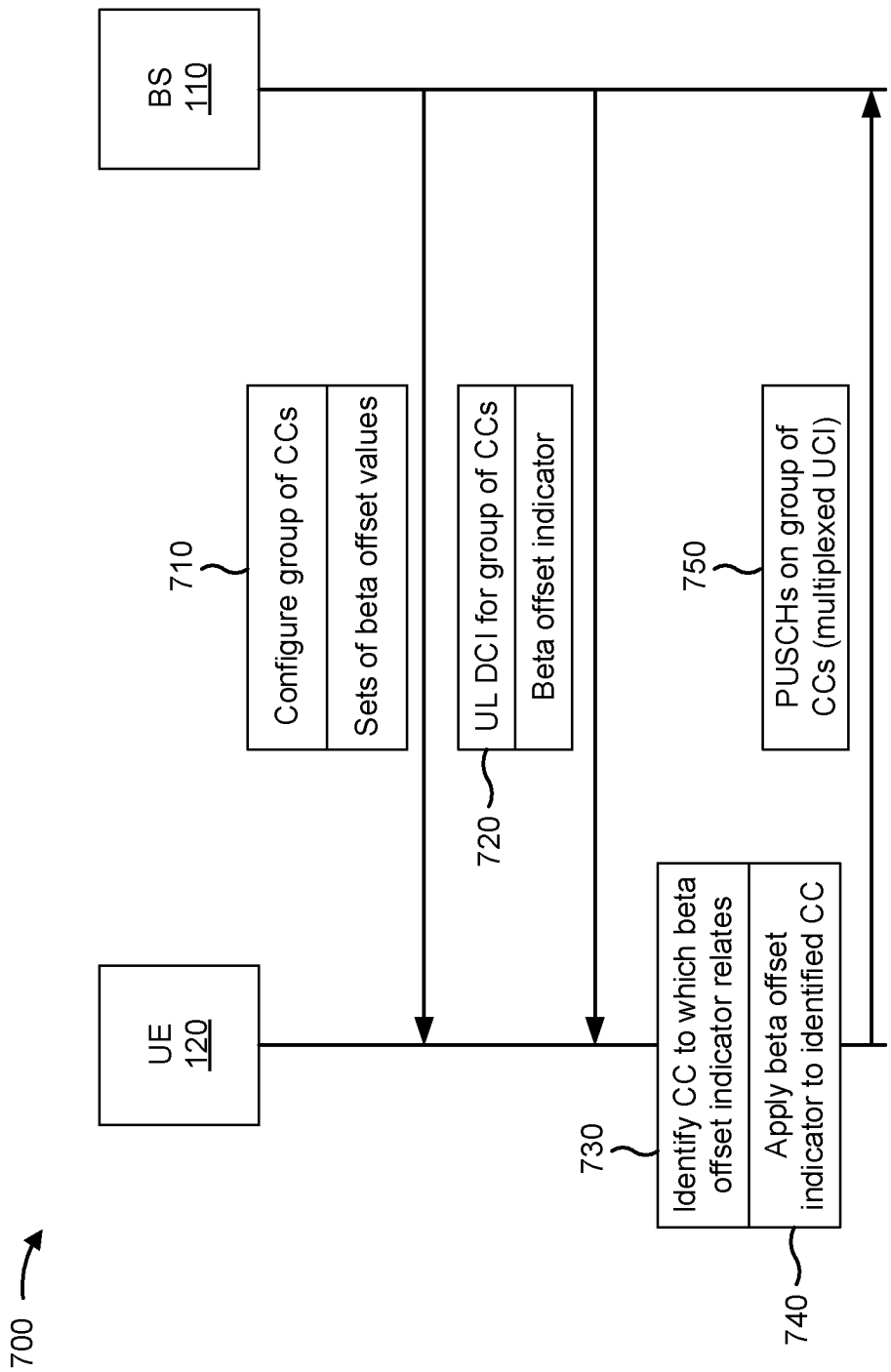

FIG. 7 is a diagram illustrating an example 700 of application of uplink DCI for multiple CCs, in accordance with various aspects of the present disclosure. As shown, example 700 includes a UE 120 and a BS 110.

As shown in FIG. 7, and by reference number 710, the BS 110 may configure a group of CCs. For example, the BS 110 may provide respective sets of beta offset values for the group of CCs. A beta offset value may identify a UCI repetition factor for multiplexing or transmitting the UCI on a PUSCH. For example, the BS 110 may provide, for each CC or bandwidth part (BWP), information (e.g., RRC information and/or the like) indicating a set of beta offset indicators and corresponding beta offset values. As shown by reference number 720, the UE 120 may receive uplink DCI for the group of CCs from the BS 110. As further shown, the uplink DCI may identify a beta offset indicator. For example, the uplink DCI may identify a beta offset indicator for a CC on which UCI is to be transmitted. Depending on which CC or BWP is to be used, the UE 120 may refer to the corresponding set of beta offset values to identify a selected beta offset value corresponding to the beta offset indicator, as described below.

As shown by reference number 730, the UE 120 may identify a CC or BWP to which the beta offset indicator relates. In some aspects, the UE 120 may identify the CC or BWP to which the beta offset indicator relates based at least in part on a rule for selecting a CC or BWP on which the UCI is to be multiplexed. For example, the UE 120 may select a CC or BWP with a smallest cell and an earliest PUSCH for which a timeline constraint is satisfied. This is described in more detail in connection with FIG. 8. In some aspects, another type of rule may be used.

As shown by reference number 740, the UE 120 may apply the beta offset of the identified CC or BWP. For example, the UE 120 may multiplex UCI and a PUSCH on the identified CC or BWP in accordance with the beta offset value corresponding to the beta offset indicator provided in the DCI. As shown by reference number 750, the UE 120 may transmit the PUSCHs on the group of CCs, including the PUSCH on which the UCI is multiplexed. Thus, a beta offset indicator in uplink DCI is applicable and associated only with the BWP/CC of the PUSCH to multiplex the UCI. Each BWP or CC can have a set of RRC configured beta offset values, and the BWP or CC with which the beta offset indicator in the uplink DCI is associated is determined based at least in part on UCI multiplexing.

In this way, a single beta offset value is signaled for a plurality of CCs, thereby reducing signaling overhead and DCI size and complexity. Reducing signaling overhead, DCI size, and DCI complexity conserves computing resources of the UE 120 and the BS 110.

As indicated above, FIG. 7 is provided as an example. Other examples may differ from what is described with respect to FIG. 7.

Figure 8:
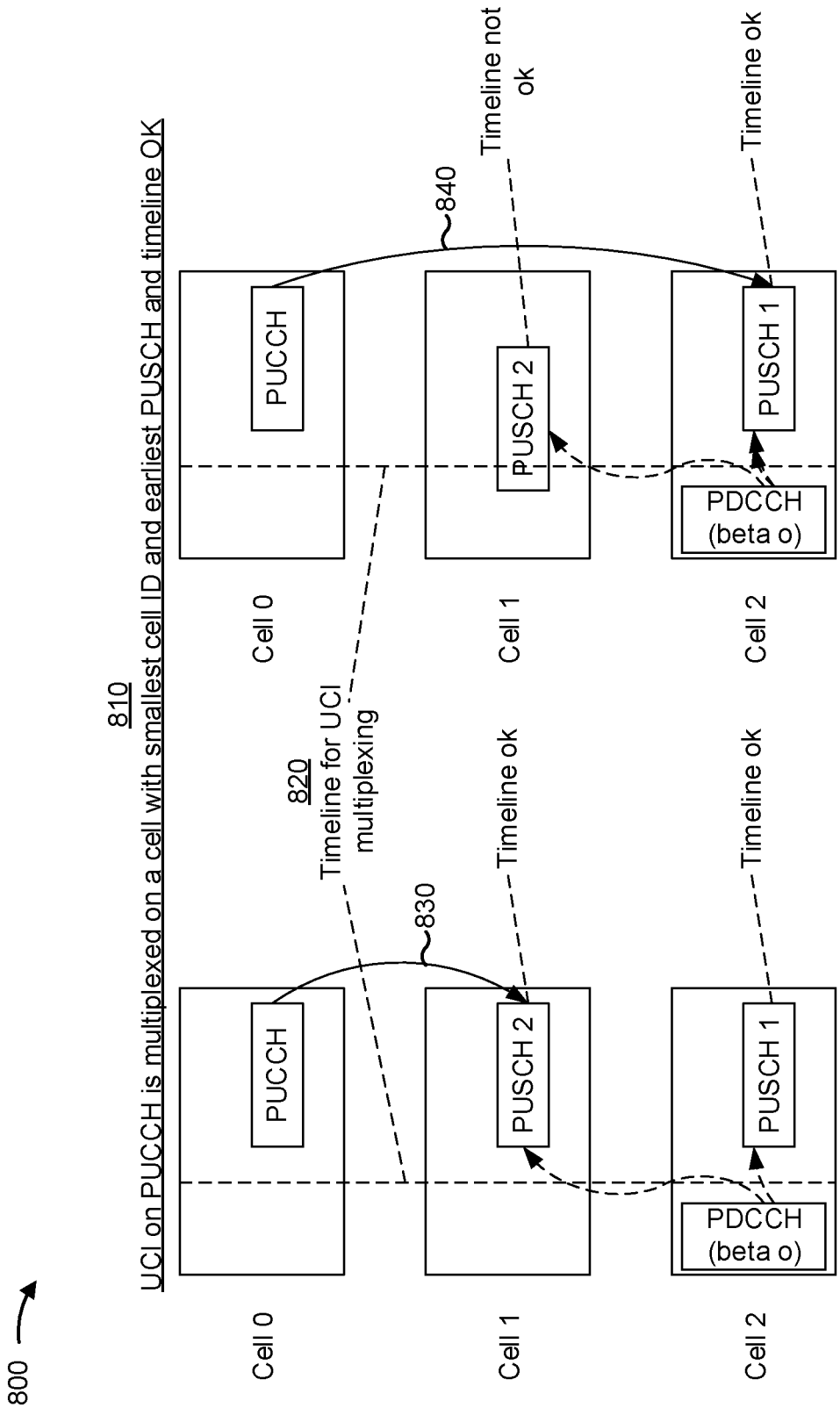

FIG. 8 is a diagram illustrating an example 800 of UCI multiplexing based at least in part on uplink DCI for multiple CCs, in accordance with various aspects of the present disclosure. Example 800 shows examples of selecting a PUSCH on which a physical uplink control channel (PUCCH) is to be multiplexed based at least in part on a rule 810. As shown, in this case, the rule 810 indicates that the UCI on the PUCCH is to be multiplexed on a cell with a smallest cell identifier and an earliest PUSCH, and for which a timeline 820 (e.g., a timeline for UCI multiplexing based at least in part on a time between reception of the PDCCH and transmission of the PUSCH) satisfies a threshold.

In a first example, as shown by reference number 830, the UE multiplexes the PUCCH on PUSCH 2 of cell 1 based at least in part on PUSCH 2 being associated with a timeline that satisfies a threshold and a lesser cell identifier than PUSCH 1 of cell 2. In this case, the UE may identify a beta offset value for the UCI in accordance with a set of beta offset values for cell 1. In a second example, as shown by reference number 840, the UE multiplexes the PUCCH on PUSCH 1 of cell 2 based at least in part on PUSCH 2 being associated with a timeline that fails to satisfy the threshold. In this case, the UE may identify a beta offset value for the UCI in accordance with a set of beta offset values for cell 2.

As indicated above, FIG. 8 is provided as an example. Other examples may differ from what is described with respect to FIG. 8.

Figure 9:
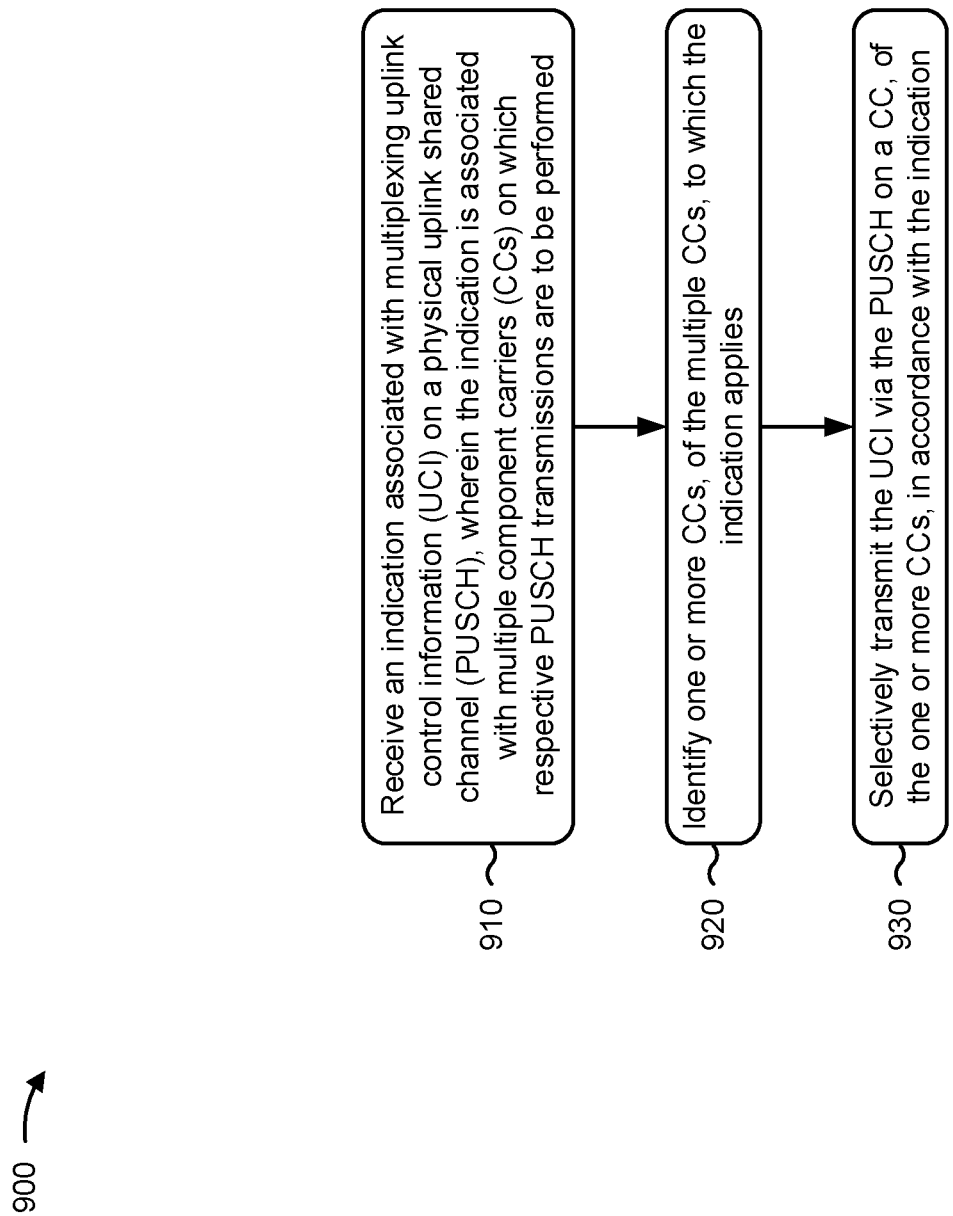
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 and/or the like) performs operations associated with uplink control information multiplexing for dynamic spectrum sharing.

As shown in FIG. 9, in some aspects, process 900 may include receiving an indication associated with multiplexing uplink control information (UCI) on a physical uplink shared channel (PUSCH), wherein the indication is associated with multiple component carriers (CCs) on which respective PUSCH transmissions are to be performed (block 910). For example, the UE (e.g., using antenna 252, DEMOD 254, MIMO detector 256, receive processor 258, controller/processor 280, and/or the like) may receive an indication associated with multiplexing UCI on a PUSCH, as described above. In some aspects, the indication is associated with multiple CCs on which respective PUSCH transmissions are to be performed.

As further shown in FIG. 9, in some aspects, process 900 may include identifying one or more CCs, of the multiple CCs, to which the indication applies (block 920). For example, the UE (e.g., using controller/processor 280 and/or the like) may identify one or more CCs, of the multiple CCs, to which the indication applies, as described above.

As further shown in FIG. 9, in some aspects, process 900 may include selectively transmitting the UCI via the PUSCH on a CC, of the one or more CCs, in accordance with the indication (block 930). For example, the UE (e.g., using controller/processor 280, transmit processor 264, TX MIMO processor 266, MOD 254, antenna 252, and/or the like) may selectively transmit the UCI via the PUSCH on a CC, of the one or more CCs, in accordance with the indication, as described above.

Process 900 may include additional aspects, such as any single aspect or any combination of aspects described below and/or in connection with one or more other processes described elsewhere herein.

In a first aspect, the indication applies to all CCs of the multiple CCs based at least in part on the multiple CCs being scheduled by a same downlink control information (DCI).

In a second aspect, alone or in combination with the first aspect, the indication comprises a downlink assignment indication (DAI).

In a third aspect, alone or in combination with one or more of the first and second aspects, process 900 includes determining that the UCI is not to be transmitted via the respective PUSCH transmissions based at least in part on a value of the DAI.

In a fourth aspect, alone or in combination with one or more of the first through third aspects, transmitting the UCI via the PUSCH on the CC is based at least in part on the DAI being associated with a value indicating that the UCI and an uplink shared channel on the PUSCH are to be multiplexed.

In a fifth aspect, alone or in combination with one or more of the first through fourth aspects, the indication comprises an uplink shared channel (UL-SCH) indication.

In a sixth aspect, alone or in combination with one or more of the first through fifth aspects, process 900 includes transmitting one or more UL-SCHs on the multiple CCs based at least in part on a value of the UL-SCH indication.

In a seventh aspect, alone or in combination with one or more of the first through sixth aspects, the UCI is multiplexed with a UL-SCH on the CC based at least in part on the value of the UL-SCH indication.

In an eighth aspect, alone or in combination with one or more of the first through seventh aspects, the UCI is not multiplexed with a respective UL-SCH, of the one or more UL-SCHs, based at least in part on the value of the UL-SCH indication.

In a ninth aspect, alone or in combination with one or more of the first through eighth aspects, the PUSCH via which the UCI is transmitted does not include a UL-SCH.

In a tenth aspect, alone or in combination with one or more of the first through ninth aspects, the indication comprises a beta offset indication.

In an eleventh aspect, alone or in combination with one or more of the first through tenth aspects, process 900 includes receiving information configuring respective sets of beta offset values for each CC of the multiple CCs, wherein the beta offset indication is identifying an index, and wherein the index is being used to determine a beta offset value from a set of beta offset values, of the respective sets of beta offset values, corresponding to the CC on which the UCI is transmitted.

In a twelfth aspect, alone or in combination with one or more of the first through eleventh aspects, the one or more CCs to which the indication applies is the CC on which the UCI is transmitted, and identifying the one or more CCs to which the indication applies further comprises identifying the one or more CCs to which the indication applies based at least in part on selecting the CC on which the UCI is transmitted in accordance with a rule for selecting the CC on which the UCI is transmitted.

In a thirteenth aspect, alone or in combination with one or more of the first through twelfth aspects, the information configuring respective sets of beta offset values for each CC of the multiple CCs comprises radio resource control information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
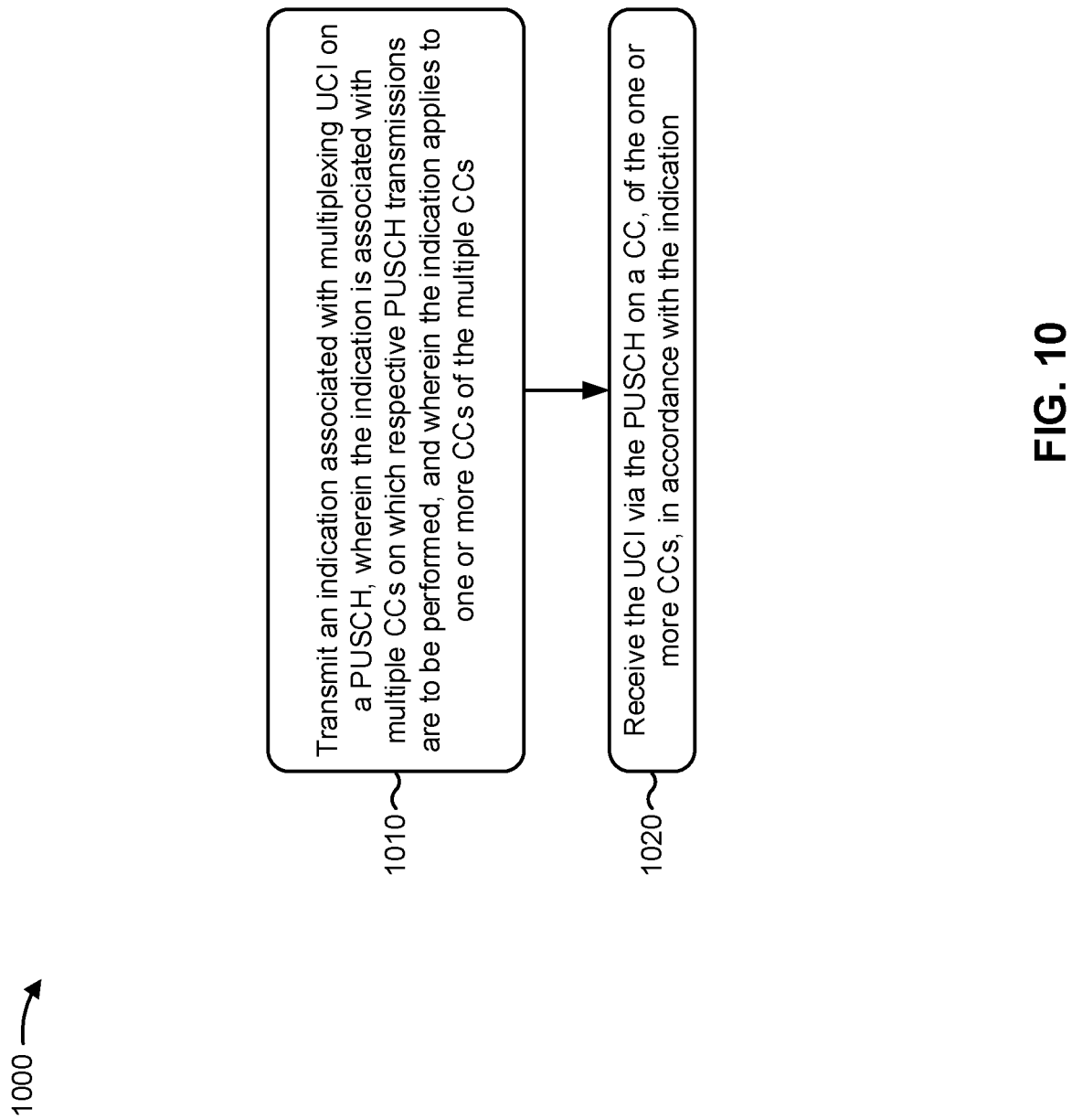
FIG. 10 is a diagram illustrating an example process performed, for example, by a base station, in accordance with various aspects of the present disclosure.

FIG. 10 is a diagram illustrating an example process 1000 performed, for example, by a base station, in accordance with various aspects of the present disclosure. Example process 1000 is an example where the base station (e.g., base station 110 and/or the like) performs operations associated with uplink control information multiplexing for dynamic spectrum sharing.

As shown in FIG. 10, in some aspects, process 1000 may include transmitting an indication associated with multiplexing UCI on a PUSCH, wherein the indication is associated with multiple CCs on which respective PUSCH transmissions are to be performed, and wherein the indication applies to one or more CCs of the multiple CCs (block 1010). For example, the base station (e.g., using controller/processor 240, transmit processor 220, TX MIMO processor 230, MOD 232, antenna 234, and/or the like) may transmit an indication associated with multiplexing UCI on a PUSCH, as described above. In some aspects, the indication is associated with multiple CCs on which respective PUSCH transmissions are to be performed. In some aspects, the indication applies to one or more CCs of the multiple CCs.

As further shown in FIG. 10, in some aspects, process 1000 may include receiving the UCI via the PUSCH on a CC, of the one or more CCs, in accordance with the indication (block 1020). For example, the base station (e.g., using antenna 234, DEMOD 232, MIMO detector 236, receive processor 238, controller/processor 240, and/or the like) may receive the UCI via the PUSCH on a CC, of the one or more CCs, in accordance with the indication, as described above.

Process 1000 may include additional aspects, such as any single aspect or any combination of aspects described below and/or in connection with one or more other processes described elsewhere herein.

In a first aspect, the indication applies to all CCs of the multiple CCs based at least in part on the multiple CCs being scheduled by a same downlink control information (DCI).

In a second aspect, alone or in combination with the first aspect, the indication comprises a downlink assignment indication (DAD.

In a third aspect, alone or in combination with one or more of the first and second aspects, process 1000 includes determining that the UCI is not to be received via the respective PUSCH transmissions based at least in part on a value of the DAI.

In a fourth aspect, alone or in combination with one or more of the first through third aspects, receiving the UCI via the PUSCH on the CC is based at least in part on the DAI being associated with a value indicating that the UCI and an uplink shared channel on the PUSCH are to be multiplexed.

In a fifth aspect, alone or in combination with one or more of the first through fourth aspects, the indication comprises an uplink shared channel (UL-SCH) indication.

In a sixth aspect, alone or in combination with one or more of the first through fifth aspects, process 1000 includes receiving one or more UL-SCHs on the multiple CCs based at least in part on a value of the UL-SCH indication.

In a seventh aspect, alone or in combination with one or more of the first through sixth aspects, the UCI is multiplexed with a UL-SCH on the CC based at least in part on the value of the UL-SCH indication.

In an eighth aspect, alone or in combination with one or more of the first through seventh aspects, the UCI is not multiplexed with a respective UL-SCH, of the one or more UL-SCHs, based at least in part on the value of the UL-SCH indication.

In a ninth aspect, alone or in combination with one or more of the first through eighth aspects, the PUSCH via which the UCI is transmitted does not include a UL-SCH.

In a tenth aspect, alone or in combination with one or more of the first through ninth aspects, the indication comprises a beta offset indication.

In an eleventh aspect, alone or in combination with one or more of the first through tenth aspects, process 1000 includes transmitting information configuring respective sets of beta offset values for each CC of the multiple CCs, wherein the beta offset indication is identifying an index, and wherein the index is being used to determine a beta offset value from a set of beta offset values, of the respective sets of beta offset values, corresponding to the CC on which the UCI is transmitted.

In a twelfth aspect, alone or in combination with one or more of the first through eleventh aspects, the one or more CCs to which the indication applies is the CC on which the UCI is received, and the indication applies to the one or more CCs based at least in part on a rule for selecting the CC on which the UCI is transmitted by the UE.

In a thirteenth aspect, alone or in combination with one or more of the first through twelfth aspects, the information configuring respective sets of beta offset values for each CC of the multiple CCs comprises radio resource control information.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving an indication associated with multiplexing uplink control information (UCI) on a physical uplink shared channel (PUSCH), wherein the indication is associated with a group of multiple component carriers (CCs) on which respective PUSCH transmissions are scheduled by a single downlink control information (DCI);
   identifying one or more CCs, of the multiple CCs, to which the indication applies; and
   selectively transmitting the UCI via the PUSCH on a CC, of the one or more CCs, in accordance with the indication.

2. The method of claim 1, wherein the indication applies to all CCs of the multiple CCs based at least in part on the multiple CCs being scheduled by a same downlink control information (DCI).

3. The method of claim 1, wherein the indication comprises a downlink assignment indication (DAI).

4. The method of claim 3, further comprising:
   determining that the UCI is not to be multiplexed with regard to a CC in the group of multiple CCs based at least in part on a value of the DAI.

5. The method of claim 3, wherein transmitting the UCI via the PUSCH on the CC is based at least in part on the DAI being associated with a value indicating that the UCI and an uplink shared channel on the PUSCH are to be multiplexed.

6. The method of claim 1, wherein the indication comprises an uplink shared channel (UL-SCH) indication.

7. The method of claim 6, further comprising:
   transmitting one or more UL-SCHs on the multiple CCs based at least in part on a value of the UL-SCH indication.

8. The method of claim 7, wherein the UCI is multiplexed with a UL-SCH on the CC based at least in part on the value of the UL-SCH indication.

9. The method of claim 6, wherein the UCI is not multiplexed with a respective UL-SCH, of the one or more UL-SCHs, based at least in part on the value of the UL-SCH indication.

10. The method of claim 9, wherein the PUSCH via which the UCI is transmitted does not include a UL-SCH.

11. The method of claim 1, wherein the indication comprises a beta offset indication.

12. The method of claim 11, further comprising:
    receiving information configuring respective sets of beta offset values for each CC of the multiple CCs, wherein the beta offset indication identifies an index, and wherein the index is used to determine a beta offset value from a set of beta offset values, of the respective sets of beta offset values, corresponding to the CC on which the UCI is transmitted.

13. The method of claim 12, wherein the one or more CCs to which the indication applies is the CC on which the UCI is transmitted, and wherein identifying the one or more CCs to which the indication applies further comprises:
    identifying the one or more CCs to which the indication applies based at least in part on selecting the CC on which the UCI is transmitted in accordance with a rule for selecting the CC on which the UCI is transmitted.

14. The method of claim 12, wherein the information configuring respective sets of beta offset values for each CC of the multiple CCs comprises radio resource control information.

15. A method of wireless communication performed by a base station, comprising:
    transmitting an indication associated with multiplexing uplink control information (UCI) on a physical uplink shared channel (PUSCH), wherein the indication is associated with a group of multiple component carriers (CCs) on which respective PUSCH transmissions are scheduled by a single downlink control information (DCI), and wherein the indication applies to one or more CCs of the multiple CCs; and
    receiving the UCI via the PUSCH on a CC, of the one or more CCs, in accordance with the indication.

16. The method of claim 15, wherein the indication applies to all CCs of the multiple CCs based at least in part on the multiple CCs being scheduled by a same downlink control information (DCI).

17. The method of claim 15, wherein the indication comprises a downlink assignment indication (DAI).

18. The method of claim 17, further comprising:
determining that the UCI is not multiplexed with regard to a CC in the group of multiple CCs based at least in part on a value of the DAI.

19. The method of claim 17, wherein receiving the UCI via the PUSCH on the CC is based at least in part on the DAI being associated with a value indicating that the UCI and an uplink shared channel on the PUSCH are to be multiplexed.

20. The method of claim 15, wherein the indication comprises an uplink shared channel (UL-SCH) indication.

21. The method of claim 20, further comprising:
receiving one or more UL-SCHs on the multiple CCs based at least in part on a value of the UL-SCH indication.

22. The method of claim 21, wherein the UCI is multiplexed with a UL-SCH on the CC based at least in part on the value of the UL-SCH indication.

23. The method of claim 20, wherein the UCI is not multiplexed with a respective UL-SCH, of the one or more UL-SCHs, based at least in part on the value of the UL-SCH indication.

24. The method of claim 23, wherein the PUSCH via which the UCI is transmitted does not include a UL-SCH.

25. The method of claim 15, wherein the indication comprises a beta offset indication.

26. The method of claim 25, further comprising:
transmitting information configuring respective sets of beta offset values for each CC of the multiple CCs, wherein the beta offset indication identifies an index, and wherein the index is used to determine a beta offset value from a set of beta offset values, of the respective sets of beta offset values, corresponding to the CC on which the UCI is transmitted.

27. The method of claim 26, wherein the one or more CCs to which the indication applies is the CC on which the UCI is received, and wherein the indication applies to the one or more CCs based at least in part on a rule for selecting the CC on which the UCI is transmitted by the UE.

28. The method of claim 26, wherein the information configuring respective sets of beta offset values for each CC of the multiple CCs comprises radio resource control information.

29. A user equipment (UE) for wireless communication, comprising:
a memory; and
one or more processors operatively coupled to the memory, the memory and the one or more processors configured to:
receive an indication associated with multiplexing uplink control information (UCI) on a physical uplink shared channel (PUSCH), wherein the indication is associated with a group of multiple component carriers (CCs) on which respective PUSCH transmissions are scheduled by a single downlink control information (DCI);
identify one or more CCs, of the multiple CCs, to which the indication applies; and
selectively transmit the UCI via the PUSCH on a CC, of the one or more CCs, in accordance with the indication.

30. A base station for wireless communication, comprising:
a memory; and
one or more processors operatively coupled to the memory, the memory and the one or more processors configured to:
transmit an indication associated with multiplexing uplink control information (UCI) on a physical uplink shared channel (PUSCH), wherein the indication is associated with a group of multiple component carriers (CCs) on which respective PUSCH transmissions are scheduled by a single downlink control information (DCI), and wherein the indication applies to one or more CCs of the multiple CCs; and
receive the UCI via the PUSCH on a CC, of the one or more CCs, in accordance with the indication.

31. An apparatus for wireless communication, comprising:
means for receiving an indication associated with multiplexing uplink control information (UCI) on a physical uplink shared channel (PUSCH), wherein the indication is associated with a group of multiple component carriers (CCs) on which respective PUSCH transmissions are scheduled by a single downlink control information (DCI);
means for identifying one or more CCs, of the multiple CCs, to which the indication applies; and
means for selectively transmitting the UCI via the PUSCH on a CC, of the one or more CCs, in accordance with the indication.

* * * * *